Patented Oct. 22, 1929

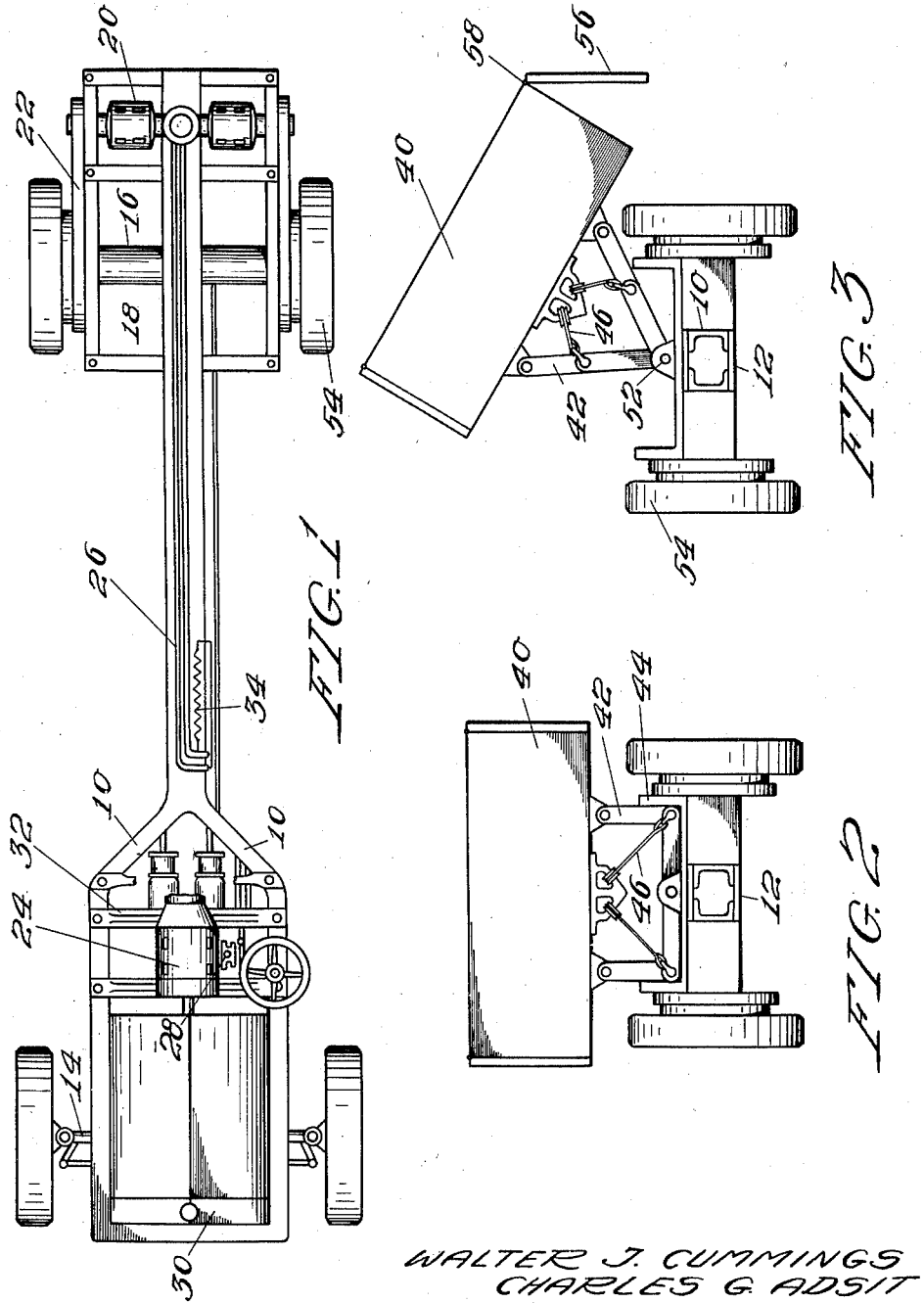

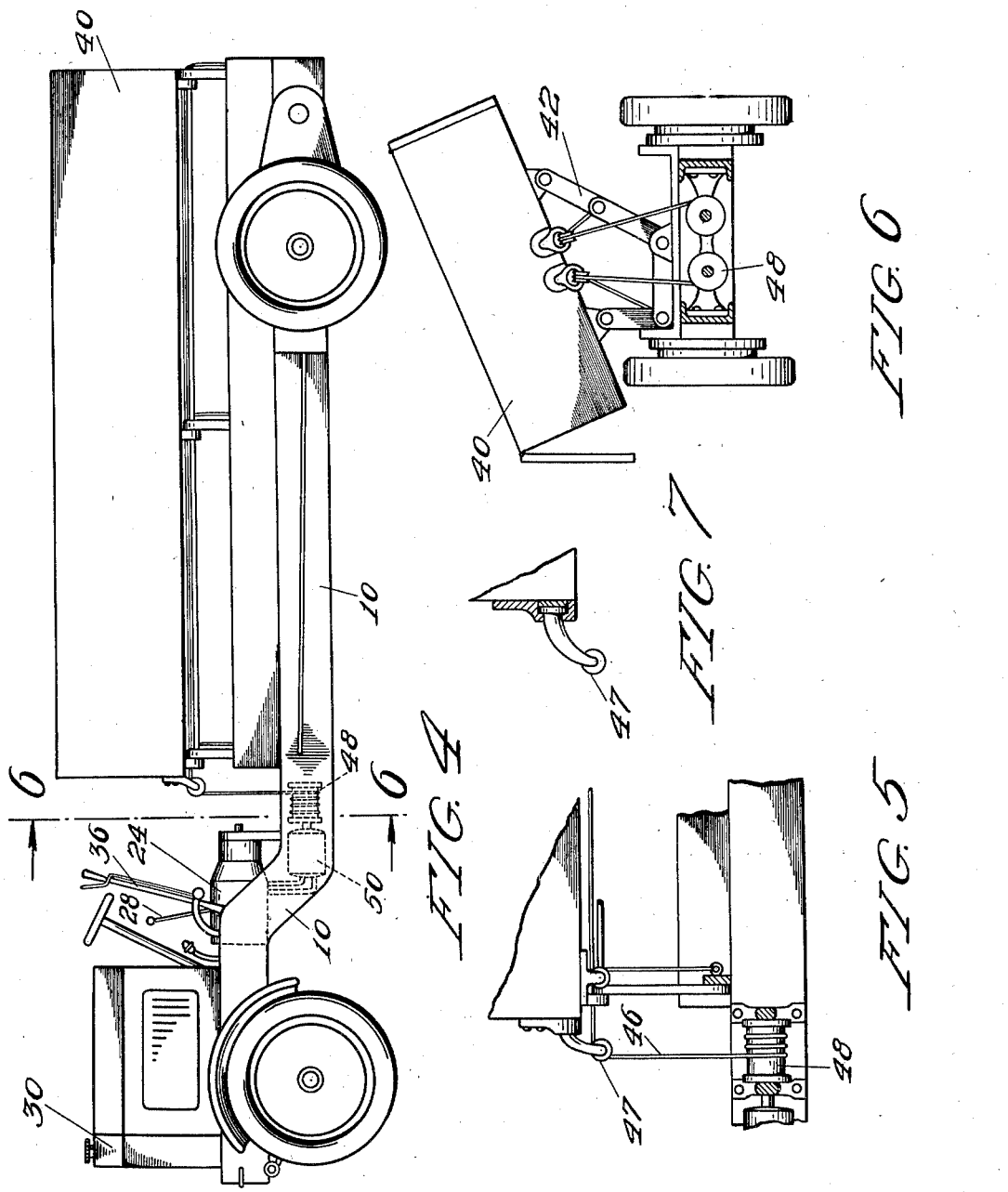

1,732,461

UNITED STATES PATENT OFFICE

WALTER J. CUMMINGS, OF CHICAGO, ILLINOIS, AND CHARLES G. ADSIT, OF ATLANTA, GEORGIA, ASSIGNORS TO CUMMINGS CAR AND COACH COMPANY, OF CHICAGO, ILLINOIS, A CORPORATION OF ILLINOIS

AUTOMOTIVE VEHICLE

Application filed May 22, 1925. Serial No. 32,007.

This invention relates to improvements in gas-electric, side-dump trucks or the like, and has for one of its objects the provision of a comparatively low truck or commercial vehicle, particularly adapted for hauling coal, gravel, or similar material, and provided with means for discharging the load at either side.

One of the objects of this invention is the provision, in a side-dump truck, of means for carrying the body and load at a minimum height above street level, together with further means for lifting and then dumping the load in such a manner as to clear the path of the wheels and the roadway.

Another object of this invention is to provide an electric transmission system and power winch for trucks, particularly side dump trucks, which will allow of a much lower construction, this being made possible by the entire elimination of transmission shafts and differential housings.

Other objects of this invention will be apparent from the disclosures in the accompanying drawings and following specification.

The invention accordingly comprises the elements and combinations of elements, features of construction, and arrangements of parts which will be exemplified in the structure hereinafter described, and the scope of the application of which will be indicated in the following claims.

The invention, in a preferred form, is illustrated in the drawings and hereinafter more fully described.

In the drawings:

Figure 1 is a top plan view of the chassis of a truck constructed in accordance with the principles of this invention.

Figure 2 is an end view of the truck, showing the body in lowered position for load transporting purposes.

Figure 3 is a similar end view showing the body raised and in dumping position.

Figure 4 is a side elevation of a truck constructed in accordance with the principles of this invention.

Figure 5 is a detail view illustrating one of the methods of raising the body into dumping position.

Figure 6 is a sectional view, taken approximately on the line 6—6 of Figure 4, looking in the direction indicated by the arrows, and showing a modification of the method of dumping.

Figure 7 is a detail view illustrating the construction of the pulley and support for the lifting cable.

As shown in the drawings:

The reference numeral 10 indicates generally the supporting rail or frame of a truck, in this instance being illustrated as comprising two channel members closely adjacent each other and connected by top and bottom plates 12 riveted thereto to form a box beam. As shown in Figure 1, the channel members 10 are separated or bent outwardly near the front of the truck, and thence raised upwardly over the front axle 14 to form a support for the motor. It will be evident that any other desired form of chassis may be used in the truck construction.

As shown, the rear axle 16 is preferably in the same horizontal plane as the rear portion of the chassis or frame 10, this construction being made possible by the elimination of a differential and mechanical power transmission means from the engine to the rear wheels, thereby enabling the body and the load to be carried at a much lower level than has heretofore been possible. A suitable spring suspension between the rear axle and the rails 10 is provided by the introduction of a spring carried frame 18, which in turn supports electric motors 20, preferably mounted at the rear of the axle 16 and connected to the wheels by chain drives positioned in housings 22. It will be seen that in effect, the central longitudinal channel members or beam 10 is supported rotatably or pivotally with respect to the rear axle, so that it can move in a vertical plane with respect to said rear axle.

Power to the motors 20 is provided by a generator-exciter unit 24, which in turn is directly connected to the gasoline or other engine of the truck, proper current carrying conduits 26 being provided for driving the motors, the current being controlled by a switch in the form of an operating lever 28 mounted adjacent the driver's seat.

The generator 24 and the engine, together with the radiator 30, are mounted on transversely extending supports 32 adapted for practically instantaneous detachment from the chassis, whereby the entire power plant can be completely removed from the frame at short notice and a new power plant substituted.

A resistance illustrated diagrammatically at 34 may be cut into the circuit by operation of the lever 28, thereby accomplishing a braking effect in addition to the usual hand brake 36. The motors 20 may also, if desired, be connected in series for pulling heavy loads at low speeds.

The battery, ordinarily used in connection with the lighting system, is used to supply field current to the exciter so that an operator, in order to start the truck, needs merely to close the ignition switch and start the engine. Depression of the throttle will then begin to furnish current to the motors 28, and upon reaching a certain minimum speed, depending upon the load, the motor armatures will turn, putting the truck into motion. As the engine speed is increased the speed of the truck will gradually increase until the maximum is reached, without at any time exceeding a safe engine speed, thereby eliminating the undue wear.

The number of engine revolutions with this drive is considerably less in any given distance, depending opon the number of stops, this advantage becoming more evident as the number of stops per mile increases. The chassis, body, tires, and all driving members will wear longer, due to the continuous torque of the motors with this electric drive.

The body 40 is preferably supported on distance, depending upon the number of pivotal jointed arms or toggle linkages 42; the action of these arms being in the nature of a toggle. In Figure 2 is illustrated the normal load carrying position of the body, wherein the arms 42 are dropped into suitable supports 44 including right angular upstanding brackets, which insure a stable position of the load for transportation purposes. Cables or other flexible coupling 46 are provided running over suitable pulleys 47, one end of each cable being connected to the jointed central portion of an arm 42 and having its other end wound on a suitable drum 48 whereby the body with its load may be raised.

These drums are operated by motors 50, which are in turn driven by current from the generator 24, suitable current carrying connections being provided and controlled by operation of the lever 28.

In Figure 3 is illustrated one method of dumping the load in the body 40, wherein both of these supporting arms 42 are first straightened, raising the body to its maximum height, the load being then permitted to tilt about the pivotal point 52, resulting in a dumping action which entirely clears the wheels 54, and throwing the load clear of the roadway. Side gates 56 are provided and adapted to be suitably locked and hinged at the top as at 58, whereby the load may be readily discharged when desired.

As shown in Figure 6, another method of dumping may be had by simply rotating one of the drums 48 by its motor 50, thereby raising only one side of the body 40. This operation, however, will not result in as great a road or wheel clearance as that illustrated in Figure 3.

In the method shown in Figure 3, some additional manual control is necessary to initially tilt the load to the side toward which it is desired to be thrown. For instance, an off-center loading will effect the desired result.

It will be clear that other means, such as racks and gears, jacks, or the like, may be used to raise the load instead of the cables 46 and toggle arms 42.

The drums 48 may also be operated as winches or hoists to facilitate loading of material, or for erecting poles, pulling wire, and various other jobs in addition to raising the load or unloading the truck.

It will be seen that herein is provided a novel form of low-body, side-dump truck, which, in addition to eliminating all mechanical power transmission means between the front and the rear axles and the further elimination of a differential or worm gear, thereby allowing of a much lower load supporting level, also permits of a simplified rear axle construction eliminating many heavy parts heretofore necessary. The position of the driving motors at the rear of the wheels permits the tension on the driving chain to be applied at the bottom of the respective sprockets, eliminating undesirable sagging with consequent friction and a tendency to displace the chain. Further, the fact that the body with its load can be pivotally dumped about a relatively low point permits of a much greater wheel and road clearance than has heretofore been possible.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim as our invention:

1. In a truck the combination of a body, a load-carrying chassis frame supporting upstanding brackets, means for pivotally joining the ends of toggle linkages between said brackets and the other ends of said linkages to said body, drums connected with said linkages at substantially mid-points by means of flexible couplings, means for rotating the drums to wind and unwind said couplings, whereby the linkages may be drawn to a straightened position and permitted to recede to an angular position within said brackets, whereby said body may be raised and lowered and tilted.

2. In a truck the combination of a body, a chassis frame supporting upstanding brackets, said brackets being between the vehicle wheels, said frame being located at substantially rear axle level, means for pivotally joining the ends of toggle linkages between said brackets and for joining the other ends of said linkages to said body, drums connected with said linkages at mid points by flexible couplings, means for rotating the drums to wind and unwind said couplings, whereby the linkages may be drawn into straightened positions from angular positions within said brackets, said straightened positions being attainable simultaneously or independently and being adapted to lift said body and produce a lateral movement and tilted positions thereof.

3. In a truck the combination of a frame supported by wheels and having a body thereover, said frame supporting upstanding brackets, said brackets being located below the uppermost points on said wheels, means for pivotally joining the ends of toggle linkages between said brackets and means for pivoting the other ends of said linkages to said body, means for moving said linkages to straightened positions, said linkages receding to angular positions within the brackets when not straightened, and means for operating said linkages so that said body may be raised and tilted over said wheels.

In testimony whereof we affix our signatures.

WALTER J. CUMMINGS.
CHARLES G. ADSIT.